ис007555002B2

United States Patent
Arndt et al.

(10) Patent No.: US 7,555,002 B2
(45) Date of Patent: Jun. 30, 2009

(54) INFINIBAND GENERAL SERVICES QUEUE PAIR VIRTUALIZATION FOR MULTIPLE LOGICAL PORTS ON A SINGLE PHYSICAL PORT

(75) Inventors: Richard Louis Arndt, Austin, TX (US); Bruce Leroy Beukema, Hayfield, MN (US); David F. Craddock, New Paltz, NY (US); Ronald Edward Fuhs, Rochester, MN (US); Thomas Anthony Gregg, Highland, NY (US); Calvin Charles Paynton, Byron, MN (US); Steven L. Rogers, Rochester, MN (US); Donald William Schmidt, Stone Ridge, NY (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 10/702,994

(22) Filed: Nov. 6, 2003

(65) Prior Publication Data

US 2005/0100033 A1 May 12, 2005

(51) Int. Cl.
*H04L 12/54* (2006.01)
(52) U.S. Cl. .................. 370/429; 370/412; 370/413; 370/419; 709/232; 718/102
(58) Field of Classification Search ............... 370/389, 370/392, 399, 412–419, 359, 395.31, 395.32, 370/395.4, 401, 428–429, 463, 459; 709/231–235; 718/102–104
See application file for complete search history.

(56) References Cited

U.S. PATENT DOCUMENTS

| | | | | |
|---|---|---|---|---|
| 5,765,032 A * | 6/1998 | Valizadeh | .................. | 709/235 |
| 6,459,698 B1 * | 10/2002 | Acharya | ..................... | 370/392 |
| 6,480,500 B1 * | 11/2002 | Erimli et al. | ................ | 370/412 |
| 6,912,604 B1 * | 6/2005 | Tzeng et al. | .................. | 710/52 |
| 6,973,085 B1 * | 12/2005 | Acharya | ..................... | 370/392 |
| 6,988,161 B2 * | 1/2006 | McConnell et al. | ......... | 710/316 |
| 6,993,026 B1 * | 1/2006 | Baum et al. | ................. | 370/392 |
| 6,999,462 B1 * | 2/2006 | Acharya | ..................... | 370/401 |
| 7,076,569 B1 * | 7/2006 | Bailey et al. | ................ | 709/250 |
| 7,099,337 B2 * | 8/2006 | Pinto | .......................... | 370/400 |
| 7,099,955 B1 * | 8/2006 | Gregg et al. | ................ | 709/238 |
| 7,116,673 B2 * | 10/2006 | Kashyap et al. | ............. | 370/412 |
| 7,188,364 B2 * | 3/2007 | Volpano | ...................... | 726/15 |
| 7,191,259 B2 * | 3/2007 | Gil | .............................. | 710/33 |
| 7,209,489 B1 * | 4/2007 | Bailey et al. | ................ | 370/412 |
| 7,210,056 B2 * | 4/2007 | Sandven et al. | ............. | 713/600 |

(Continued)

*Primary Examiner*—Aung S Moe
*Assistant Examiner*—Curtis A Alia
(74) *Attorney, Agent, or Firm*—Yee & Associates, P.C.; Diana R. Gerhardt

(57) ABSTRACT

An aliased queue pair is provided within a logically partitioned data processing system for each logical partition for the single general services management queue pair that exists within a physical host channel adapter. Packets intended for the logical ports are received at the physical port. Multiple partitions exist within the data processing system. When one of these partitions needs to use one of the logical ports, a queue pair is selected. The queue pair is then associated with the logical port. The queue pair is configured as an aliased general services management queue pair and is used by the partition as if the aliased queue pair were the single general services management queue pair provided in the channel adapter.

14 Claims, 12 Drawing Sheets

U.S. PATENT DOCUMENTS

| | | | |
|---|---|---|---|
| 7,243,160 B2* | 7/2007 | Brahmaroutu | 709/238 |
| 7,292,567 B2* | 11/2007 | Terrell et al. | 370/363 |
| 2001/0043564 A1* | 11/2001 | Bloch et al. | 370/230 |
| 2002/0159385 A1* | 10/2002 | Susnow et al. | 370/229 |
| 2003/0043805 A1* | 3/2003 | Graham et al. | 370/392 |
| 2003/0061379 A1* | 3/2003 | Craddock et al. | 709/238 |
| 2003/0101158 A1* | 5/2003 | Pinto et al. | 707/1 |
| 2003/0206548 A1* | 11/2003 | Bannai et al. | 370/389 |
| 2003/0208645 A1* | 11/2003 | Matters et al. | 710/36 |
| 2005/0271073 A1* | 12/2005 | Johnsen et al. | 370/428 |
| 2005/0286511 A1* | 12/2005 | Johnsen et al. | 370/389 |
| 2006/0002385 A1* | 1/2006 | Johnsen et al. | 370/389 |

* cited by examiner

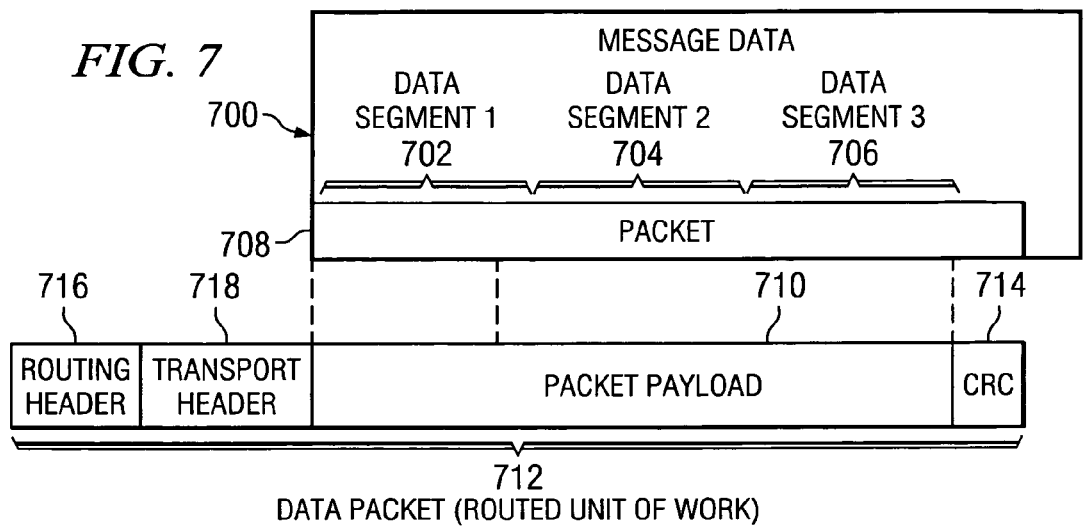
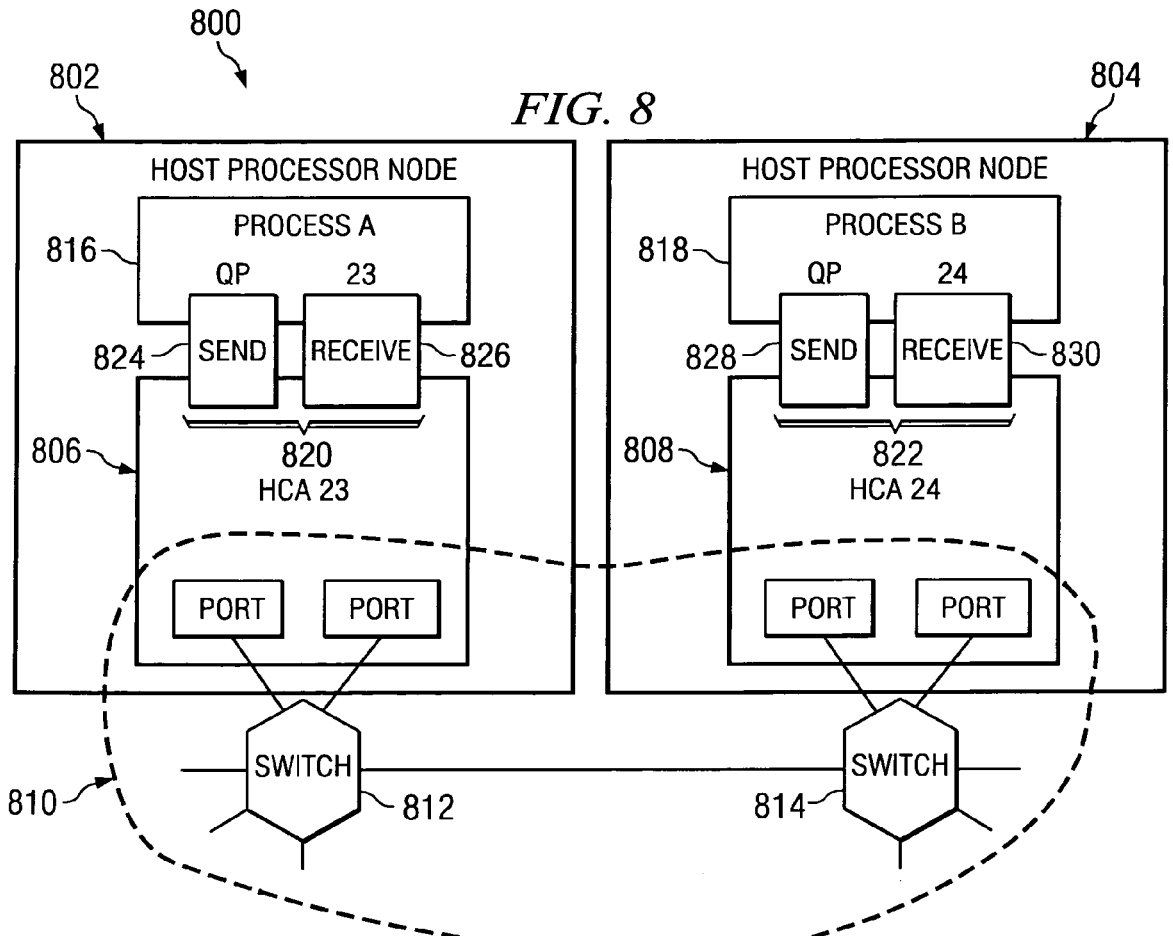

INFINIBAND GENERAL SERVICES QUEUE PAIR VIRTUALIZATION FOR MULTIPLE LOGICAL PORTS ON A SINGLE PHYSICAL PORT

BACKGROUND OF THE INVENTION

1. Technical Field

The present invention is directed to an improved data processing system. More specifically, the present invention is directed to a method, system, and computer program product for providing a virtualized General Services queue pair in multiple logical ports on a single physical port.

2. Description of Related Art

InfiniBand (IB) provides a hardware message passing mechanism which can be used for Input/Output devices (I/O) and Interprocess Communications (IPC) between general computing nodes. Consumers access IB message passing hardware by posting send/receive messages to send/receive work queues on an IB Channel Adapter (CA). The send/receive work queues (WQ) are assigned to a consumer as a Queue Pair (QP). Consumers retrieve the results of these messages from a Completion Queue (CQ) through IB send and receive work completions (WC).

The source CA takes care of segmenting outbound messages and sending them to the destination. The destination CA takes care of reassembling inbound messages and placing them in the memory space designated by the destination's consumer. There are two CA types: Host CA and Target CA. The Host Channel Adapter (HCA) is used by general purpose computing nodes to access the IB fabric. Consumers use IB verbs to access Host CA functions. The software that interprets verbs and directly accesses the CA is known as the Channel Interface (CI).

Each General Services Queue Pair is conventionally associated with a physical port in a CA. However, it is desirable for a Host CA to be associated with multiple logical partitions of a server. Therefore, an efficient mechanism is needed to associate a single physical port and queue pair with multiple logical partitions. Therefore, it would be advantageous to have such a method, apparatus, and program to direct packets to logical partitions within a Host CA.

SUMMARY OF THE INVENTION

The present invention provides an aliased queue pair 1 (QP1) communication channel for each logical port on a logical Host Channel Adapter and for each logical switch. A normal unreliable datagram queue pair is selected and designated as the General Services QPr for a logical port. In this manner, it appears to the partition that is using a logical port that the partition has access to the single QP1 that is defined for the HCA.

Rather than dedicating separate physical resources for each of the low-utilization QP1 communication channels, a standard unreliable datagram queue pair can be configured to be an aliased QP1, which allows the implementation to scale to support relatively large numbers of partitions without wasting resources. The number of supported partitions is limited only by the size of a lookup table used to associate an aliased QP1 with a logical HCA port.

A general services manager Queue Pair associated with a Logical Partition is referred to as an aliased Queue Pair. Using its associated aliased Queue Pair, a general services manager may communicate with other nodes on the subnet as well as logical nodes within the same physical Host Channel Adapter.

A method, system, and computer program product are disclosed within a logically partitioned data processing system for providing an aliased queue pair for each logical partition for the single general services management queue pair that exists within a physical host channel adapter. Packets intended for the logical ports are received at the physical port. Multiple partitions exist within the data processing system. When one of these partitions needs to use one of the logical ports, a queue pair is selected. The queue pair is then associated with the logical port. The queue pair is configured as an aliased general services management queue pair and is used by the partition as if the aliased queue pair were the single general services management queue pair provided in the channel adapter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an illustration of a data packet in accordance with the present invention;

FIG. 8 is a diagram illustrating a portion of a distributed computer system in accordance with the present invention;

DETAILED DESCRIPTION OF THE PREFERRED EMBODIMENT

The present invention provides an apparatus and method for managing general management Queue Pairs for Logical Partitions in a Host Channel Adapter. The present invention may be implemented in hardware, software, or a combination of hardware and software. The present invention is preferably implemented in a distributed computing system, such as a system area network (SAN) having end nodes, switches, routers, and links interconnecting these components.

Figure 1:
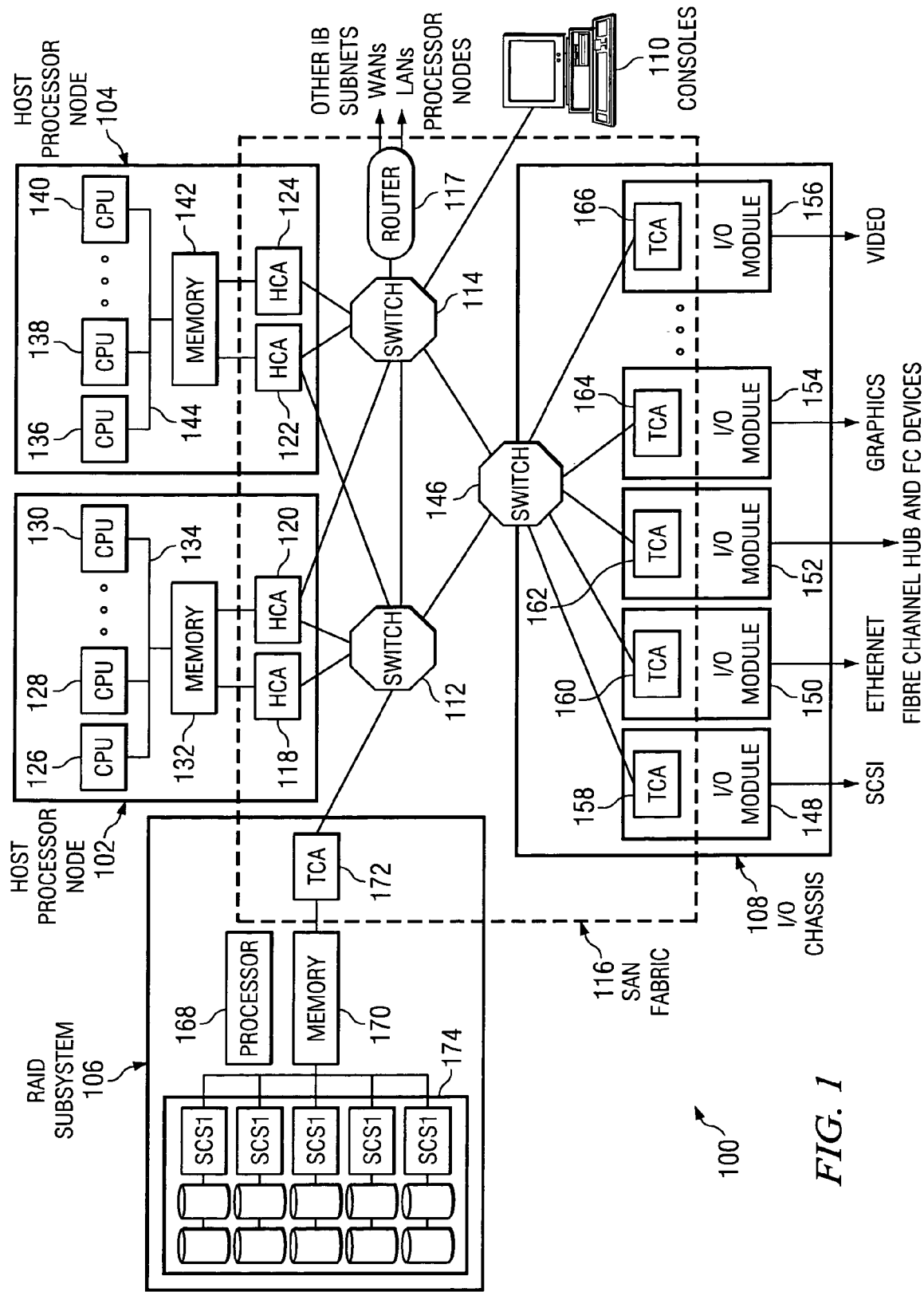
FIG. 1 is a diagram of a distributed computer system that may be used to implement the present invention in accordance with the present invention.

FIG. 1 is a diagram of a distributed computer system in accordance with a preferred embodiment of the present invention. The distributed computer system represented in FIG. 1 takes the form of a system area network (SAN) 100 and is provided merely for illustrative purposes. The embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN 100. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 116. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
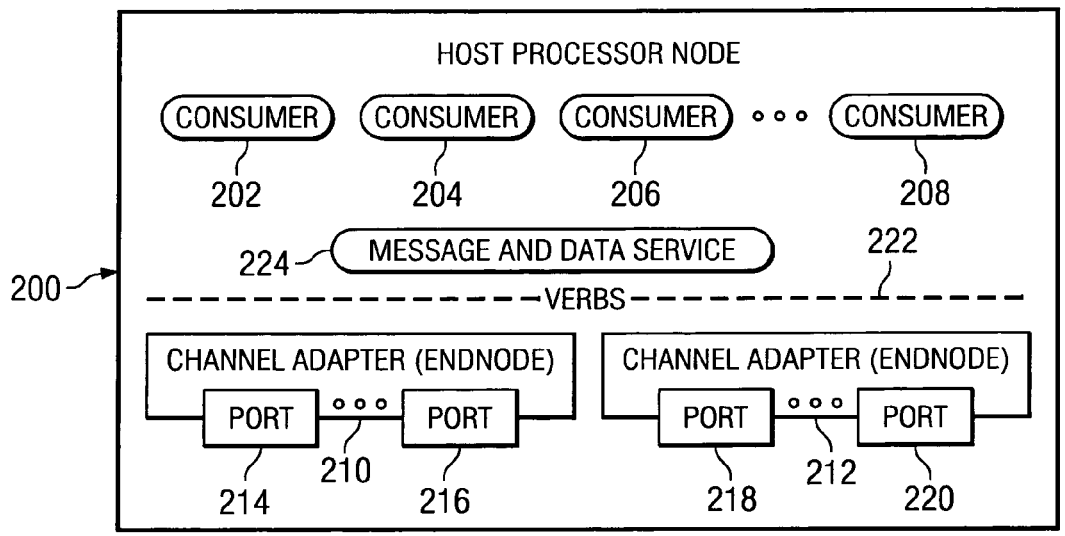
FIG. 2 is a functional block diagram of a host processor node in accordance with the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

Figure 3A:
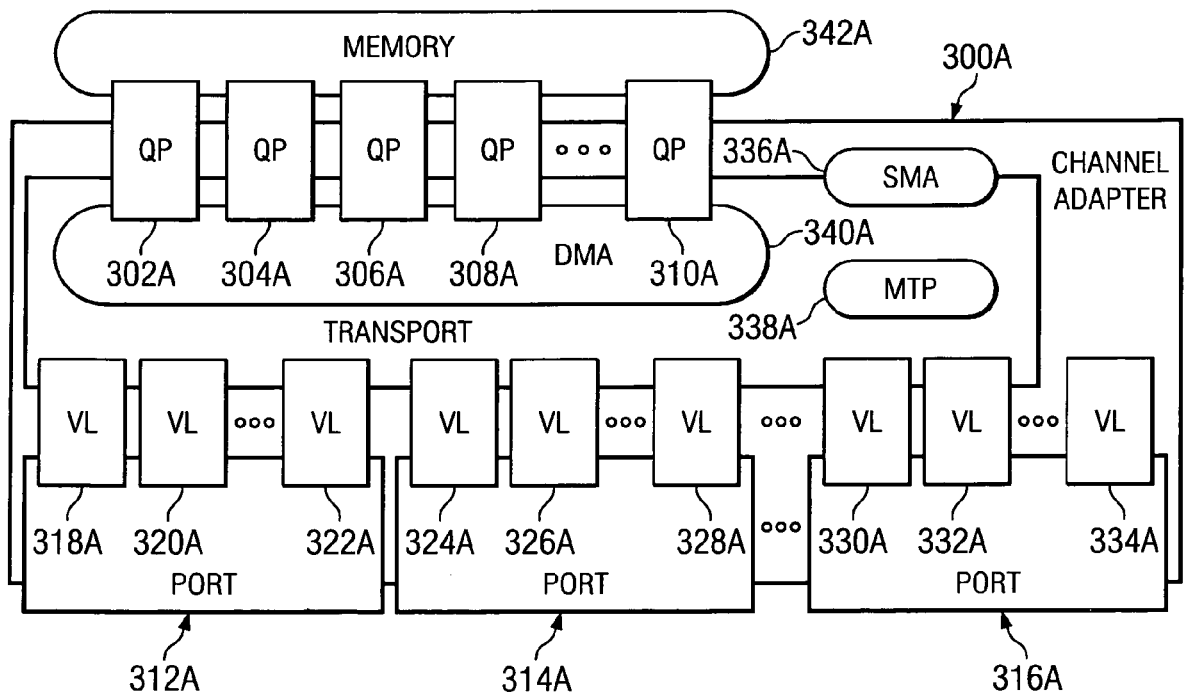
FIG. 3A is a diagram of a host channel adapter in accordance with the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A-310A, which are used to transfer messages to the host channel adapter ports 312A-316A. Buffering of data to host channel adapter ports 312A-316A is channeled through virtual lanes (VL) 318A-334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 342A with respect to queue pairs 302A-310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
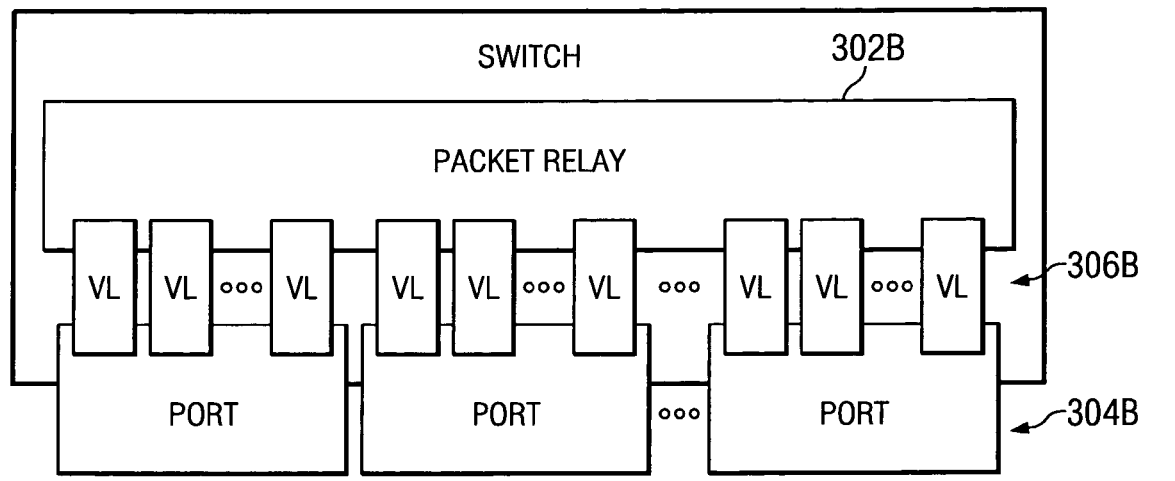
FIG. 3B is a diagram of a switch in accordance with the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
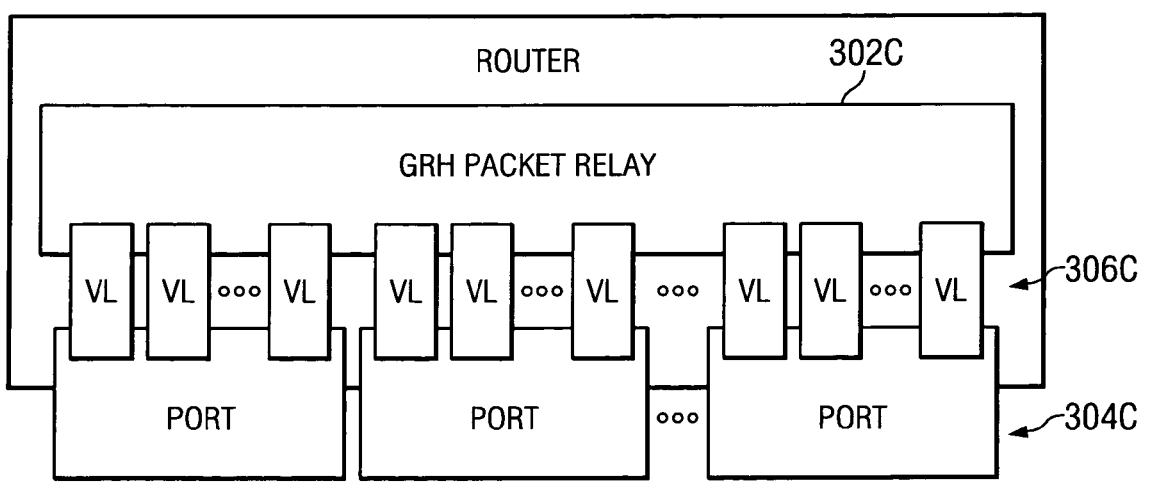
FIG. 3C is a diagram of a router in accordance with the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect end nodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress. Virtual lanes are employed for numerous reasons, some of which are as follows:

Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
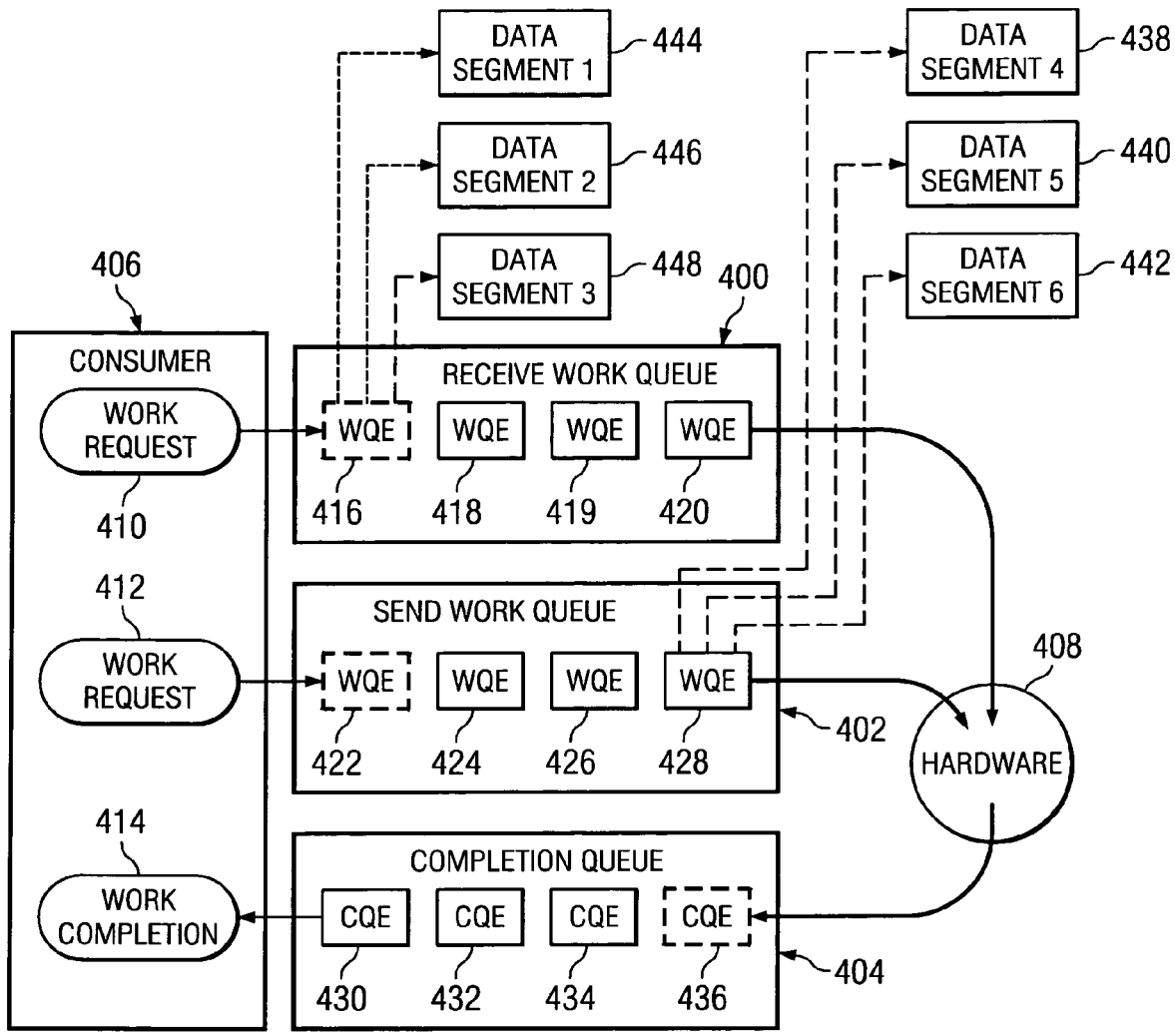
FIG. 4 is a diagram illustrating processing of work requests in accordance the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory space. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 3 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal. A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable connection, unreliable connection, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $p^2 \times (N-1)$ queue pairs. Moreover, a process can connect a queue pair to another queue pair on the same host channel adapter.

Figure 5:
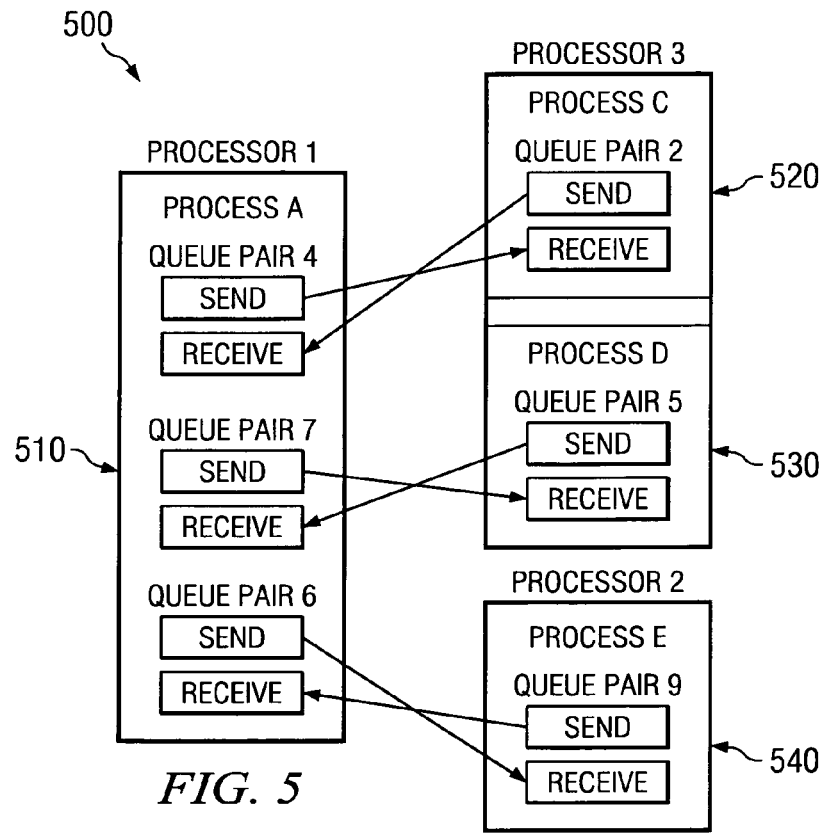
FIG. 5 is a diagram illustrating a portion of a distributed computer system in accordance with the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 3 includes a process C 520 and a process D 530. Host processor node 2 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

Figure 6:
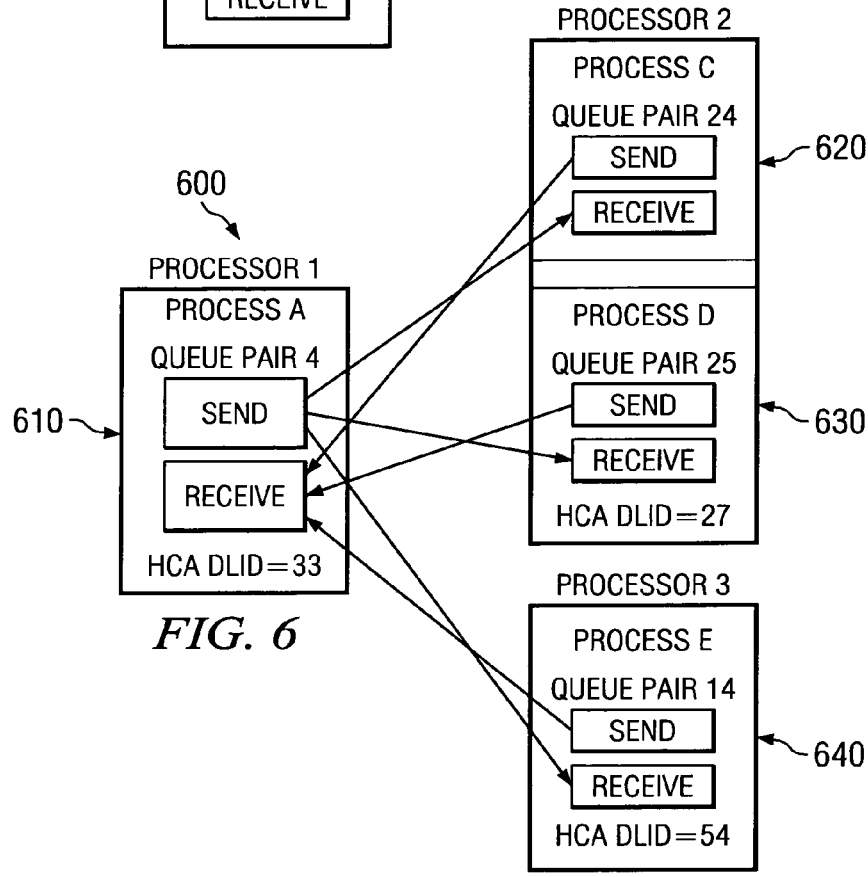
FIG. 6 is a diagram illustrating a portion of a distributed computer system in accordance with the present invention in which reliable datagram service connections are used.

The reliable datagram service greatly improves scalability because the reliable datagram service is connectionless. Therefore, an end node with a fixed number of queue pairs can communicate with far more processes and end nodes with a reliable datagram service than with a reliable connection transport service. For example, if each of N host processor nodes contain P processes, and all P processes on each node wish to communicate with all the processes on all the other nodes, the reliable connection service requires $p^2 \times (N-1)$ queue pairs on each node. By comparison, the connectionless reliable datagram service only requires P queue pairs+(N-1) EE contexts on each node for exactly the same communications. A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of end nodes. Each end node requires at least one EE context for every end node it wishes to communicate with in the reliable datagram service (e.g., a given end node requires at least N EE contexts to be able to have reliable datagram service with N other end nodes).

The unreliable datagram service is connectionless. The unreliable datagram service is employed by management applications to discover and integrate new switches, routers, and end nodes into a given distributed computer system. The unreliable datagram service does not provide the reliability guarantees of the reliable connection service and the reliable datagram service. The unreliable datagram service accordingly operates with less state information maintained at each end node.

Turning next to FIG. 7, an illustration of a data packet is depicted in accordance with a preferred embodiment of the present invention. A data packet is a unit of information that is routed through the SAN fabric. The data packet is an end-node-to-end-node construct, and is thus created and consumed by end nodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send, RDMA write, RDMA read, or atomic. The packet sequence number is initialized when communication is established and increments each time a queue pair creates a new packet. Ports of an end node may be configured to be members of one or more possibly overlapping sets called partitions.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 23 (824 and 826). Client process B interacts with hardware channel adapter hardware 808 through queue pair 24 (828 and 830). Queue pairs 23 and 24 are data structures that include a send work queue and a receive work queue.

Process A initiates a message request by posting work queue elements to the send queue 824 of queue pair 23. Such a work queue element is illustrated in FIG. 4. The message request of client process A is referenced by a gather list contained in the send work queue element. Each data segment in the gather list points to a virtually contiguous local memory space, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
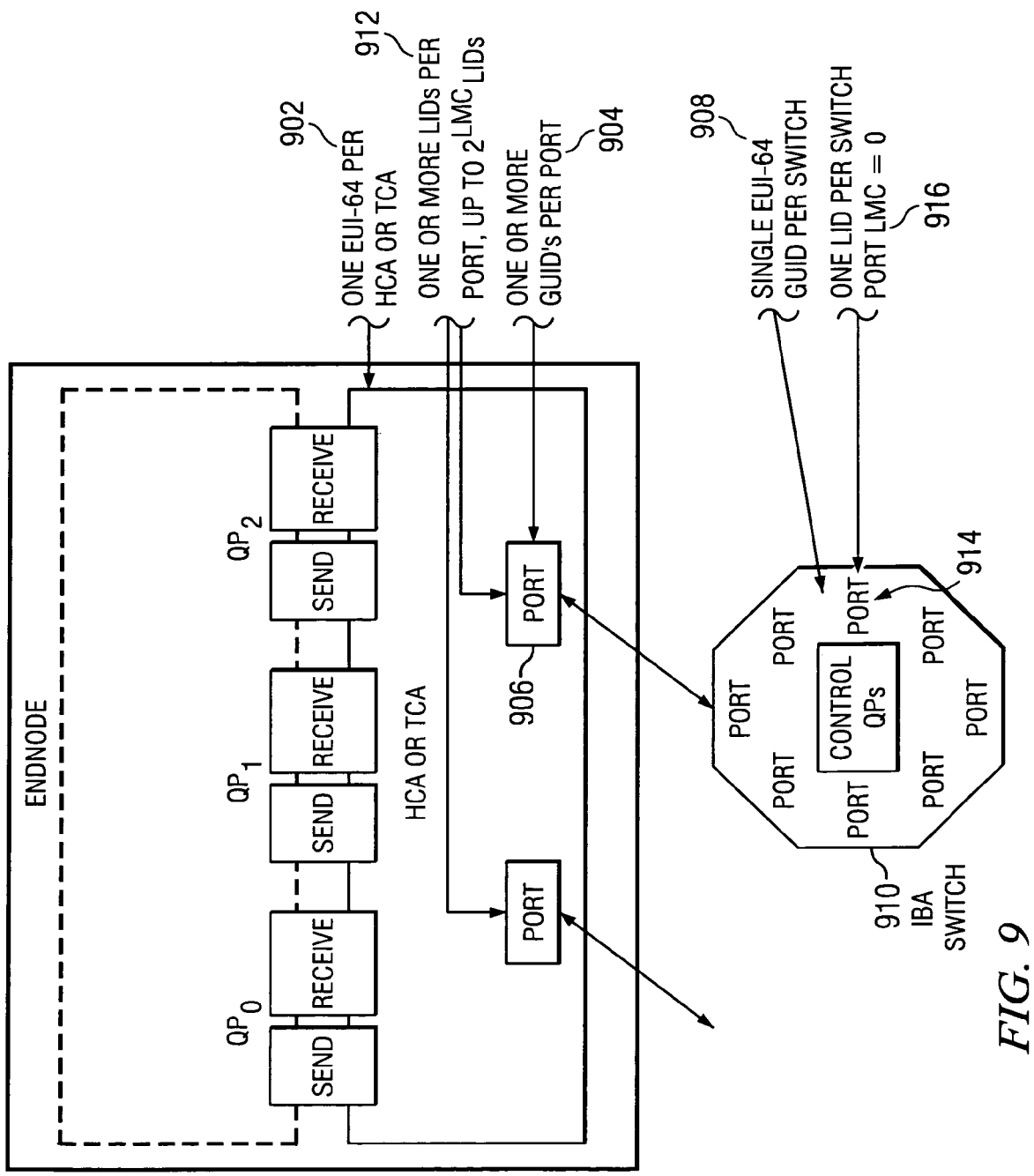
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs. A single IEEE assigned 64-bit identifier (EUI-64) 902 is assigned to each component. A component can be a switch, router, or CA.

One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes.

One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 906 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. A single switch port 914 has one LID 916 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
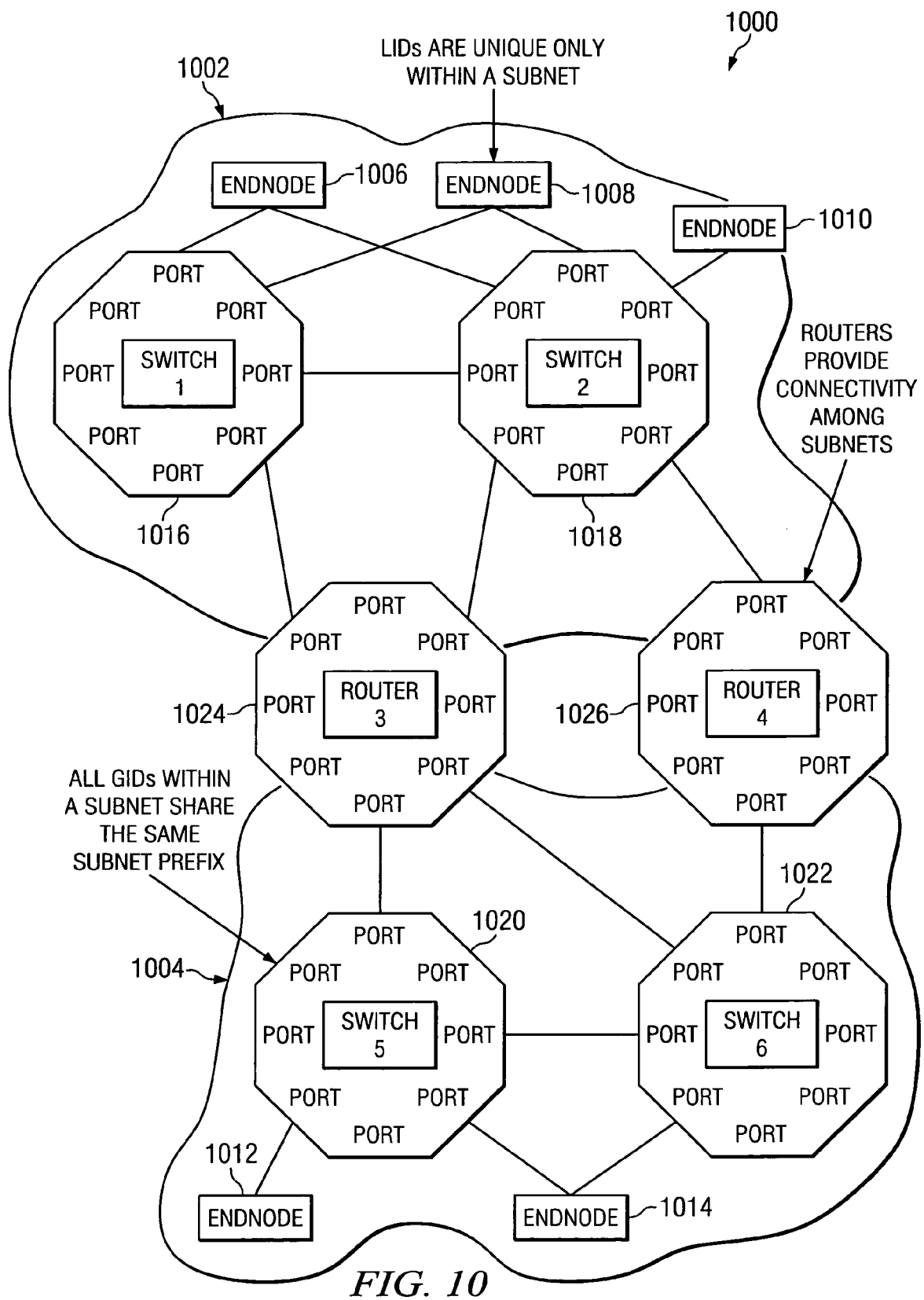
FIG. 10 is a diagram illustrating a portion of a distributed computing system in accordance with the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to $2^{16}$ end nodes, switches, and routers.

A subnet is defined as a group of end nodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of end nodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch. Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing certain routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination end node resides on a remote subnet.

If a reliable transport service is employed, when a request data packet reaches its destination end node, acknowledgment data packets are used by the destination end node to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
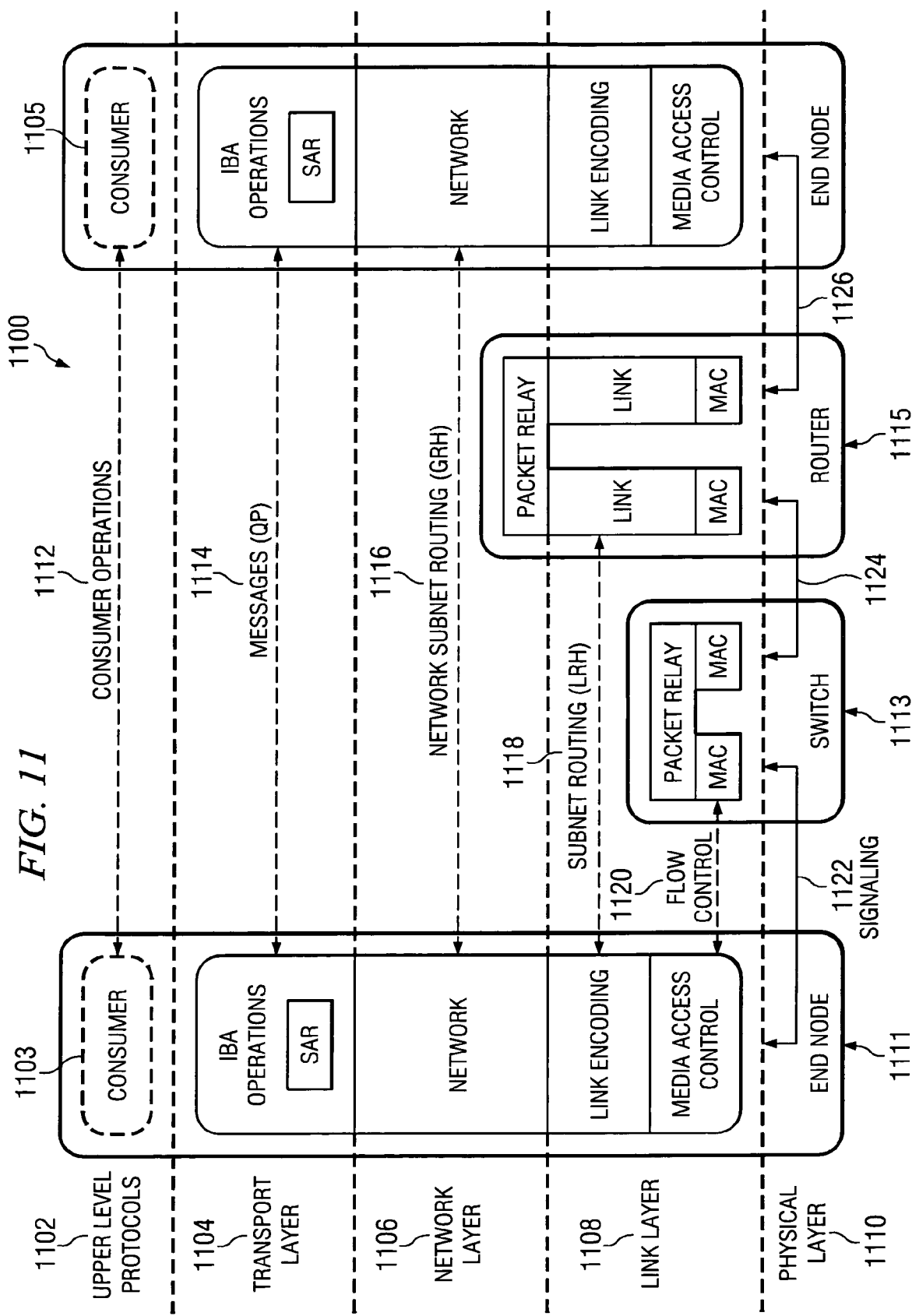
FIG. 11 is a diagram of a layered communication architecture used in a preferred embodiment of the present invention in accordance with the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adapter end node protocol layers (employed by end node 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs to create messages at transport layer 1104. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between end nodes. Transport layer 1104 provides end-to-end message movement. In one embodiment, the transport layer provides four types of transport services as described above which are reliable connection service; reliable datagram service; unreliable datagram service; and raw datagram service. Network layer 1106 performs packet routing through a subnet or multiple subnets to destination end nodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

Figure 12:
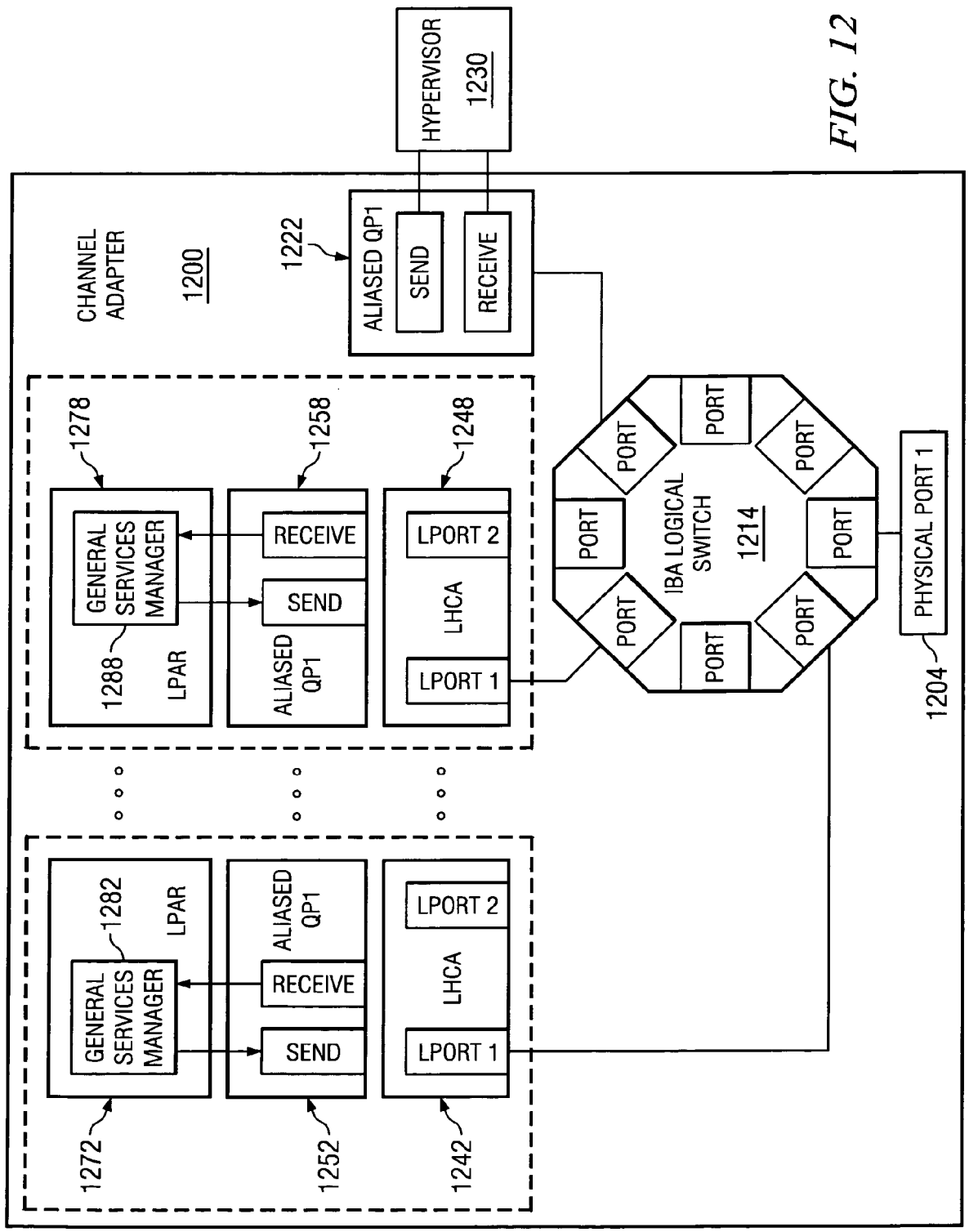
FIG. 12 depicts a Host Channel Adapter in a Logical Partitioning environment in accordance with the present invention.

FIG. 12 depicts a physical Host Channel Adapter 1200 in a Logical Partitioning environment in accordance with a preferred embodiment of the present invention.

The InfiniBand standard defines a special queue pair called QP0 and a special queue pair called QP1. All other queue pairs are referred to herein as "normal" queue pairs. QP0 is used to communicate subnet management packets. QP1 is used to communicate all other general services management packets. Thus, QP1 is used for all management packets other than subnet management packets. Only one QP0 and only one QP1 exist, according to the InfiniBand standard, for each physical HCA.

When a source physical HCA transmits a General Services packet to a destination physical HCA, the packet is identified as being destined for the QP1 in the destination physical HCA by storing a one in the field that indicates the logical queue pair number for the packet. In the prior art, there is only one QP1 for each physical HCA. Therefore, when a destination physical HCA receives a packet having a logical one as its logical queue pair number, that packet was sent to the physical HCA's QP1.

According to the present invention, multiple different aliased QP1s will exist in a single physical HCA. The present invention permits different partitions to utilize a single physical HCA and to each have apparently exclusive use of the HCA's QP1. Each partition will have an associated aliased QP1. By utilizing the aliased QP1 that is associated with a partition, the partition will have apparently exclusive use of the HCA's QP1.

In order to permit partitioning while ensuring that processing associated with one partition does not affect other partitions, each aliased QP1 is associated with a different logical port within the physical HCA. Each logical port, and each logical switch, is associated with a different aliased QP1.

When a destination physical HCA receives a packet having a logical one as its logical queue pair number, the destination physical HCA must determine which one of its different aliased QP1s is supposed to receive the packet. Thus, the present invention provides a method, system, and product for routing an incoming QP1 packet to the appropriate aliased QP1.

The present invention provides an aliasing table that is utilized to properly route QP1 packets to the intended destination aliased QP1. Information identifying a logical port or logical switch is stored in the aliasing table along with information that identifies a particular queue pair. The particular queue pair is thus associated with the logical switch or logical port. When a General Services packet is received that is destined for QP1 for a particular logical port or logical switch, the aliasing table is utilized to determine which queue pair is associated with that logical port or switch. The packet is then routed to the QP1 associated with that logical port or switch. In this manner, QP1 packets are routed to their intended aliased QP1. The physical HCA 1200 includes physical port 1 1204. A person of ordinary skill in the art will recognize that the HCA may include additional ports depending on the implementation. HCA 1200 also includes logical switch 1214. Physical HCA 1200 is associated with a plurality of Logical Partitions, LPAR 1272 to LPAR 1278. The LPARs are associated with Logical Host Channel Adapters, LHCA 1242 to LHCA 1248.

The present invention provides mechanisms for routing and processing QP1 traffic on behalf of multiple logical ports when there are multiple aliased QP1s within the physical port.

There are three aliased QP1s shown in HCA 1200. Partition 1272 includes an aliased QP1 1252, and partition 1278 includes an aliased QP1 1258.

Figure 13:
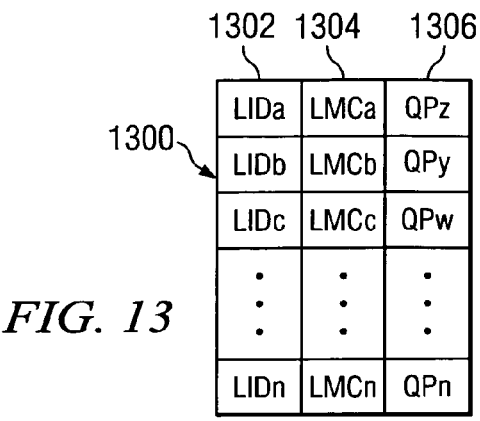
FIG. 13 illustrates a queue pair aliasing table in accordance with the present invention.

An aliased QP1 1222 is associated with logical switch 1214. The logical switch has an aliased QP1 associated with it and a corresponding entry in table 1300 (FIG. 13). This aliased QP1 is owned by hypervisor code that manages the logical switch and responds to General Services Managers requests.

FIG. 13 illustrates a queue pair aliasing table 1300 in accordance with the present invention. Table 1300 includes multiple entries. Each entry includes an LID field 1302 for storing local identifiers, an LMC field 1304 for storing a LID mask count, and a QP field 1306 for storing real queue pair numbers. There is a different aliasing table for each physical port of the HCA.

Each queue pair has an associated real queue pair number. This real queue pair number is used to identify and locate the particular queue pair. According to the present invention, a partition may communicate using a particular logical port of the HCA. Each logical port is identified by its own unique LID.

In order to create an aliased QP1, a normal queue pair is selected. The selected queue pair has a real queue pair number that identifies that particular queue pair. This real queue pair number is then put in table 1300 in field 1306 in one of the entries. The LID of the logical port that the partition is using is then put in the LID field 1302. In this manner, a particular queue pair is associated with a particular logical port and thereby with the partition that is using the logical port.

The LMC identifies the range of LIDs that is associated with the logical port.

The logical switch has its own LID and its own aliased QP1 that is used for communicating with General Services managers. The LID, LMC and real QP number for the logical switch occupy an entry in the table.

Figure 14:
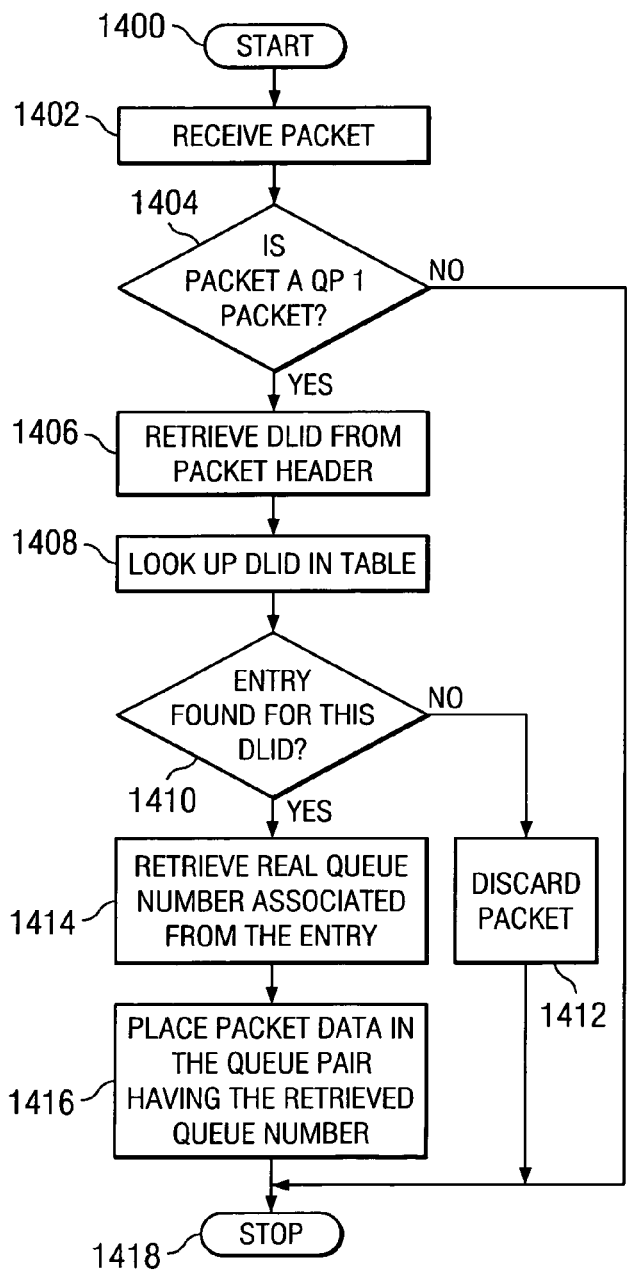
FIG. 14 is a high level flowchart which illustrates the process of receiving a packet in a Host Channel Adapter in accordance with the present invention.

FIG. 14 is a high level flowchart which illustrates the process of receiving a packet in a Host Channel Adapter in accordance with the present invention. The process starts as depicted by block 1400 and thereafter passes to block 1402 which illustrates receiving a packet. Next, block 1404 depicts a determination of whether or not the packet is a QP1 packet by determining whether the packet has a destination logical QP number equal to one. If a determination is made that the packet is not destined for QP1, the process terminates as illustrated by block 1418.

Referring again to block 1404, if a determination is made that the packet is destined for QP1, the process passes to block 1406 which illustrates retrieving the destination LID (DLID) from the packet header. The process then passes to block 1408 which depicts looking up this DLID in the aliasing table.

Thereafter, block 1410 illustrates a determination of whether or not this DLID was found in the table. If a determination is made that the DLID was not found in the table, the process passes to block 1412 which depicts discarding the packet. The process then terminates as illustrated by block 1418.

Referring again to block 1410, if a determination is made that this DLID was found in the table, the process passes to block 1414 which illustrates retrieving the real queue number for the queue pair that is included in the entry that includes this DLID. Thus, the real queue pair number is located that is associated with this DLID. Next, block 1416 depicts placing the packet data in the queue pair identified by the real queue number. The process then terminates as illustrated by block 1418.

Figure 15:
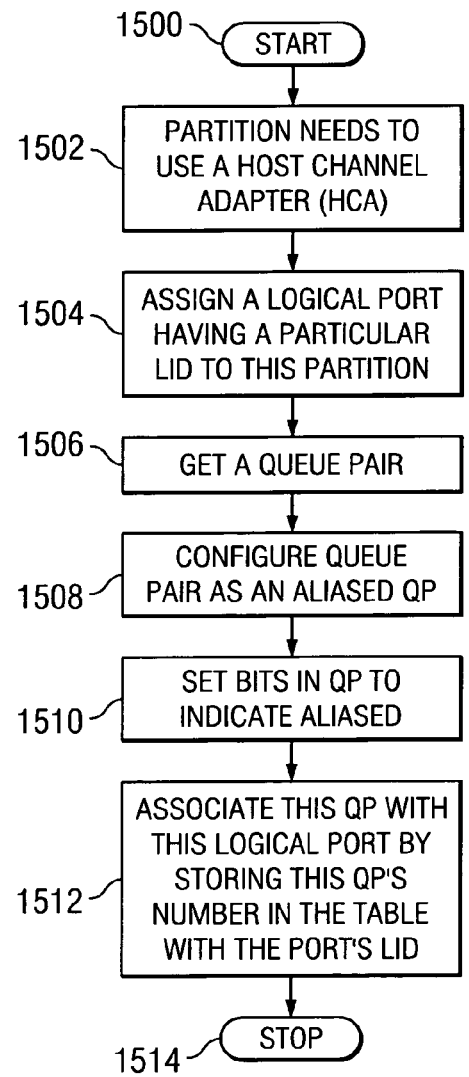
FIG. 15 is a high level flow chart which depicts associating an aliased queue pair with a logical partition in accordance with the present invention.

FIG. 15 is a high level flow chart which depicts associating an aliased queue pair with a logical partition in accordance with the present invention. The process starts as depicted by block 1500 and thereafter passes to block 1502 which illustrates a partition needing to use a host channel adapter (HCA). Next, block 1504 depicts assigning a logical port to the partition. Each logical port has its own unique LID. Thus, a logical port having a particular LID is assigned to the partition.

The process then passes to block 1506 which illustrates getting a normal unreliable datagram queue pair. Block 1508, then, depicts configuring the queue pair as an aliased queue pair. Thereafter, block 1510 illustrates setting bits in the queue pair to indicate that the queue pair is an aliased QP1 queue pair. Then, block 1512 depicts associating this queue pair with the logical port assigned to the partition by storing the real queue pair number that identifies this queue pair in the table along with the LID that identifies the logical port. The process then terminates as illustrated by block 1514.

Figure 16:
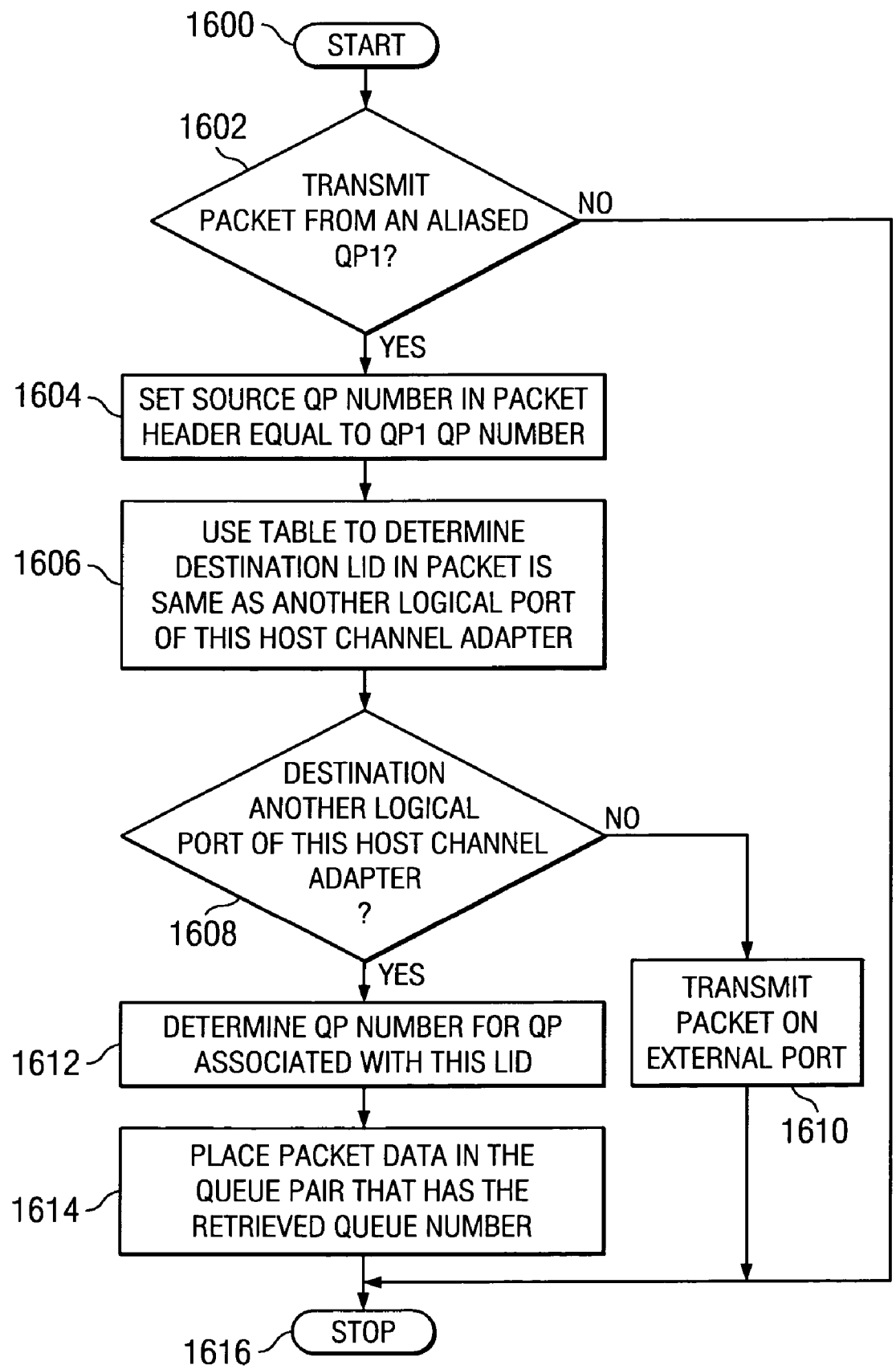
FIG. 16 is a high level flow chart which illustrates the process of sending a General Services management packet in a Host Channel Adapter in accordance with a preferred embodiment of the present invention.

FIG. 16 is a high level flow chart which illustrates the process of sending a General Services management packet in a Host Channel Adapter in accordance with a preferred embodiment of the present invention. The process starts as depicted by block 1600 and thereafter passes to block 1602 which illustrates a determination of whether or not the packet to be transmitted is an aliased QP1 packet. If a determination is made that the packet is not an aliased QP1 packet, the process terminates as depicted by block 1616.

Referring again to block 1602, if a determination is made that the packet is an aliased QP1 packet, the process passes to block 1604 which illustrates setting the logical source queue pair number in the packet header equal to a logical one. A logical one in the source queue pair number indicates that QP1 is the source of the packet. Each unreliable datagram packet header includes a queue pair number that identifies the queue pair that generated the packet. When QP1 generates a packet, the queue pair number that identifies QP1 is included in the packet header. When an aliased QP1 generates a packet, a logical one should be included instead of the number for the particular aliased QP1 so that the destination queue pair will determine that QP1 sent the packet.

The process then passes to block 1606 which depicts using the aliasing table to determine whether the destination LID in the packet is the same as a LID for another logical port of this same HCA. Block 1608 illustrates determining whether another logical port of this HCA has the same DLID. If a determination is made that no other logical port of this HCA has the same DLID, the process passes to block 1610 which depicts transmitting the packet using an external port of the HCA. The process then terminates as illustrated by block 1616.

Referring again to block 1608, if a determination is made that another logical port of this HCA does have this DLID, the process passes to block 1612 which illustrates determining the real queue pair number for the queue pair that is associated with this LID. Next, block 1614 depicts placing the packet data in the queue pair that is associated with this DLID. The process then terminates as depicted by block 1616.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logically partitioned data processing system for emulating multiple logical ports on a physical port, said data processing system including logical partitions, the method comprising:
    providing a single general services management queue pair for the physical port, wherein the single general services management queue pair is used for communicating only management packets;
    providing a plurality of logical ports, wherein management packets intended for the plurality of logical ports are received at the physical port, and further wherein each one of said logical partitions is associated with a different one of said plurality of logical ports and communicates management packets using said different one of said plurality of logical ports;
    providing an aliased general services management queue pair for each of the plurality of logical ports, wherein said aliased general services management queue pair is used for communicating only management packets;
    including, in each one of said logical partitions, a general services manager;
    providing a logical switch for said physical port;
    providing an aliased general services management queue pair for said logical switch, wherein the aliased general services management queue pair for said logical switch is used for communicating only management packets, and wherein said aliased general services management queue pair for said logical switch is owned by hypervisor code that manages said logical switch and responds to requests made by the general services managers, and wherein said logical switch uses said aliased general services management queue pair for said logical switch to communicate with said general services managers;
    determining that a particular one of said logical partitions needs to use a particular one of said plurality of logical ports, wherein said particular one of said logical partitions is associated with said particular one of said logical ports;
    selecting a normal unreliable datagram queue pair;
    associating said normal unreliable datagram queue pair with said one of said plurality of logical ports;
    configuring said normal unreliable datagram queue pair as an aliased general services management queue pair; and
    utilizing, by said one of said partitions, said normal unreliable datagram queue pair as said single general services management queue pair.

2. The method according to claim 1, further comprising:
    associating a separate aliased general services management queue pair with each one of said plurality of logical ports.

3. The method according to claim 1, further comprising:
    providing an aliasing table;
    said aliasing table including associations between aliased general services management queue pairs and logical ports; and
    storing an entry in said aliasing table identifying said normal unreliable datagram queue pair with said one of said plurality of logical ports, said normal unreliable datagram queue pair being associated with said one of said plurality of logical ports utilizing said aliasing table.

4. The method according to claim 3, further comprising:
    storing a real queue pair number that identifies said normal unreliable datagram queue pair in said entry.

5. The method according to claim 3, further comprising:
    storing a local identifier (LID) and LID Mask Count (LMC) that identifies said one of said plurality logical ports in said entry.

6. The method according to claim 3, further comprising:
    receiving a packet at the physical port; and
    responsive to the packet being intended for a given logical port, routing the packet to the given logical port utilizing said aliasing table.

7. The method of claim 3, further comprising:
    sending a packet from an aliased general services management queue pair; and
    responsive to the packet being intended for a given logical port, routing the packet to the sending aliased general services management queue pair for the logical port.

8. The method of claim 7, further comprising:
    responsive to the packet being intended for an external port, routing the packet to the physical port.

9. The method of claim 3, further comprising:
    storing an entry in said aliasing table identifying said normal unreliable datagram queue pair with said logical switch, said normal unreliable datagram queue pair being associated with said logical switch utilizing said aliasing table; and
    said normal unreliable datagram queue pair being said aliased general services management queue pair for said logical switch.

10. The method of claim 3, wherein each general services management queue pair is an InfiniBand general services management queue pair one.

11. The method according to claim 3, further comprising:
   determining that one of said aliased general services management queue pairs should be used to transmit a packet;
   determining a real queue pair number that identifies said single general services management queue pair; and
   inserting queue pair number one for said general services management queue pair into said packet instead of a real queue number that identifies said one of said aliased general services management queue pairs.

12. The method according to claim 3, further comprising:
   receiving a packet;
   determining whether said packet is destined for said single general services management queue pair;
   in response to determining that said packet is destined for said single general services management queue pair, determining a destination one of said plurality of logical ports associated with said packet; and
   utilizing said destination one of said plurality of logical ports associated with said packet to identify one of said aliased general services management queue pairs.

13. The method according to claim 12, further comprising:
   looking up said destination one of said plurality of logical ports in said aliasing table;
   identifying an aliased general services management queue pair that is associated with said destination one of said plurality of logical ports; and
   forwarding said packet to said identified aliased general services management queue pair.

14. The method according to claim 1, further comprising:
   configuring said normal unreliable datagram queue pair as an aliased general services management queue pair by setting bits in said normal unreliable datagram queue pair.

* * * * *